United States Patent [19]

Peterson

[11] Patent Number: 5,266,020
[45] Date of Patent: Nov. 30, 1993

[54] DEVICE FOR PRODUCING HOLLOW SHAPED PLASTIC ARTICLES

[75] Inventor: Christer C. I. Peterson, Lidingö, Sweden

[73] Assignee: Aktiebolaget Electrolux, Sweden

[21] Appl. No.: 472,200

[22] Filed: Jan. 30, 1990

[30] Foreign Application Priority Data

Feb. 9, 1989 [SE] Sweden .................................. 8900440

[51] Int. Cl.⁵ .................................................. B29C 45/16
[52] U.S. Cl. ........................................... 425/130; 264/572
[58] Field of Search ................ 264/45.1, 572, 537, 264/40.3, 40.7, 328.8, 328.9, 328.12, 328.13, 328.7, 513, 522; 425/130, 568, 149, 562, 526, 533, 535, 536, 542, 547, 567, 513, 584, 512

[56] References Cited

U.S. PATENT DOCUMENTS 4,129,635 12/1978 Yasuke et al. .................. 264/328.12

FOREIGN PATENT DOCUMENTS 127961 12/1984 European Pat. Off. .
250080 12/1987 European Pat. Off. .

Primary Examiner—Tim Heitbrink
Attorney, Agent, or Firm—Pearne, Gordon, McCoy & Granger

[57] ABSTRACT

A device for producing hollow plastic articles by injection molding, the device having a nozzle (10) with a first inlet opening for melted plastic from the injection molding machine and a second inlet opening for a gas, the nozzle including a pipe for directing gas into the melted plastic and an outlet opening for the gas and for the melted plastic, the outlet opening, via a gate, being connectable with a mold cavity. The second inlet opening communicates via a conduit (28) with a gas accumulator (29) having a constant volume and in which the gas is maintained at a generally constant pressure. The conduit also has associated with it a variable throttle (32) by which the gas flow through the conduit can be adjusted.

15 Claims, 3 Drawing Sheets

DEVICE FOR PRODUCING HOLLOW SHAPED PLASTIC ARTICLES

BACKGROUND OF THE INVENTION

This invention relates to a device for producing hollow plastic articles by injection molding, the device including a nozzle having a first inlet opening for melted plastic from an injection molding machine and a second inlet opening for a pressurized gas, and an outlet opening for the gas and the melted plastic, the outlet opening being connectable to a mold via a gate.

It is known in the art to produce hollow plastic articles having walls that are shaped by a mold used with a device as set forth above. German patent DE-OS 2 461 580 describes a device in which melted plastic is ejected through a nozzle into a mold, the nozzle outlet including a central outlet for a gas. The gas and the melted plastic are transferred to the associated mold simultaneously, wherein the melted plastic surrounds the gas and forms an expanded shell which solidifies against the walls of the mold. As an example of a suitable gas, nitrogen is mentioned. In order to force the gas into and expand the melted plastic, a cylinder is used to which the gas is transferred from a suitable source. The cylinder is, via a conduit and a valve, connected to the central outlet in the nozzle. The cylinder is filled with gas, the gas is compressed by means of the piston, and the gas is then introduced into the melted plastic when the associated valve is opened.

A similar method is described in European patent EP 127 961 according to which the cylinder, which is used to force the gas into the melted plastic, also serves as a measuring or metering device for the gas in order to adapt the gas volume to the article being produced. The piston has a stroke which is variable and which can be set at a predetermined value corresponding to the gas volume which is desired. After filling the cylinder, the gas supply is cut off and the gas is compressed by moving the piston forwards. At a certain pressure the associated valve is opened and the gas expands the melted plastic within the mold cavity.

The devices described above, among other things, minimize sinkings, i.e. local deformation defects which are formed when producing thick-walled plastic articles. Moreover, a better economy is achieved compared to other devices since the consumption of plastic material is reduced. Also, a significant weight reduction of the molded article results.

SUMMARY OF THE INVENTION

The present invention provides a means for adjusting the flow of gas into the nozzle which is less complex than arrangements which are previously known. Another purpose is to create a possibility to recollect the gas or, at least a part of the gas, which is used during the procedure to expand the injected plastic within the mold.

The present invention provides a nozzle with a first inlet opening for melted plastic, and a second inlet opening for a pressurized gas. The second inlet opening communicates via a conduit with a gas accumulator having a constant volume and in which a gas is maintained at a generally constant pressure. A variable throttle controls and adjust the pressurized gas flow through the conduit from the accumulator to the nozzle.

BRIEF DESCRIPTION OF THE DRAWINGS

An embodiment of the invention will now be described with reference to the attached drawings wherein FIG. 1 diagrammaticly illustrates a device according to the present invention, whereas

DETAILED DESCRIPTION OF THE PREFERRED EMBODIMENT

Figure 1:
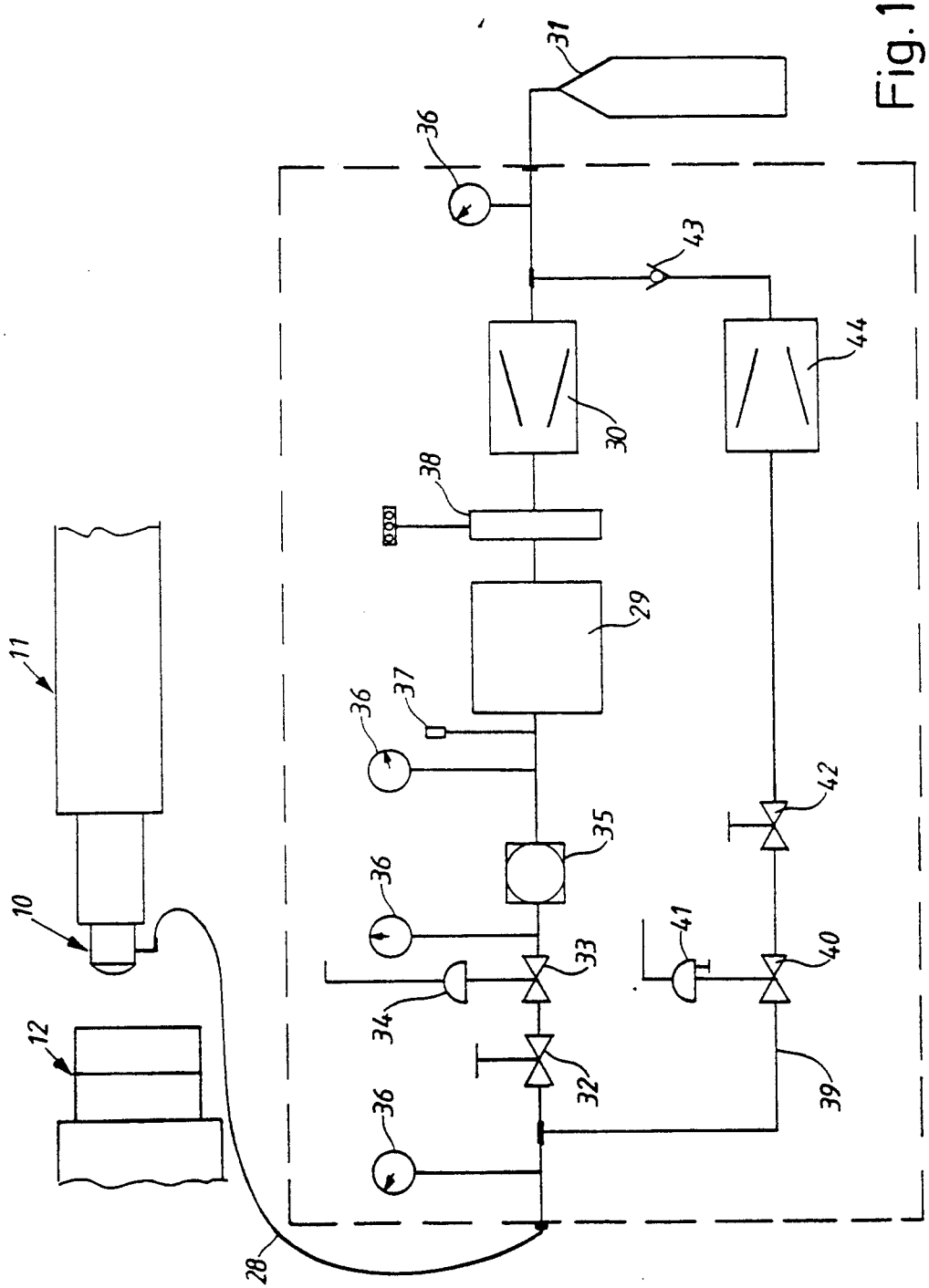

With reference to FIG. 1, the device comprises a nozzle 10 connected to a conventional plastic injection machine 11. The nozzle is, in the usual way, movable to abut a mold 12 comprising mold space with which the nozzle communicates via a gate in the mold.

Figure 2:
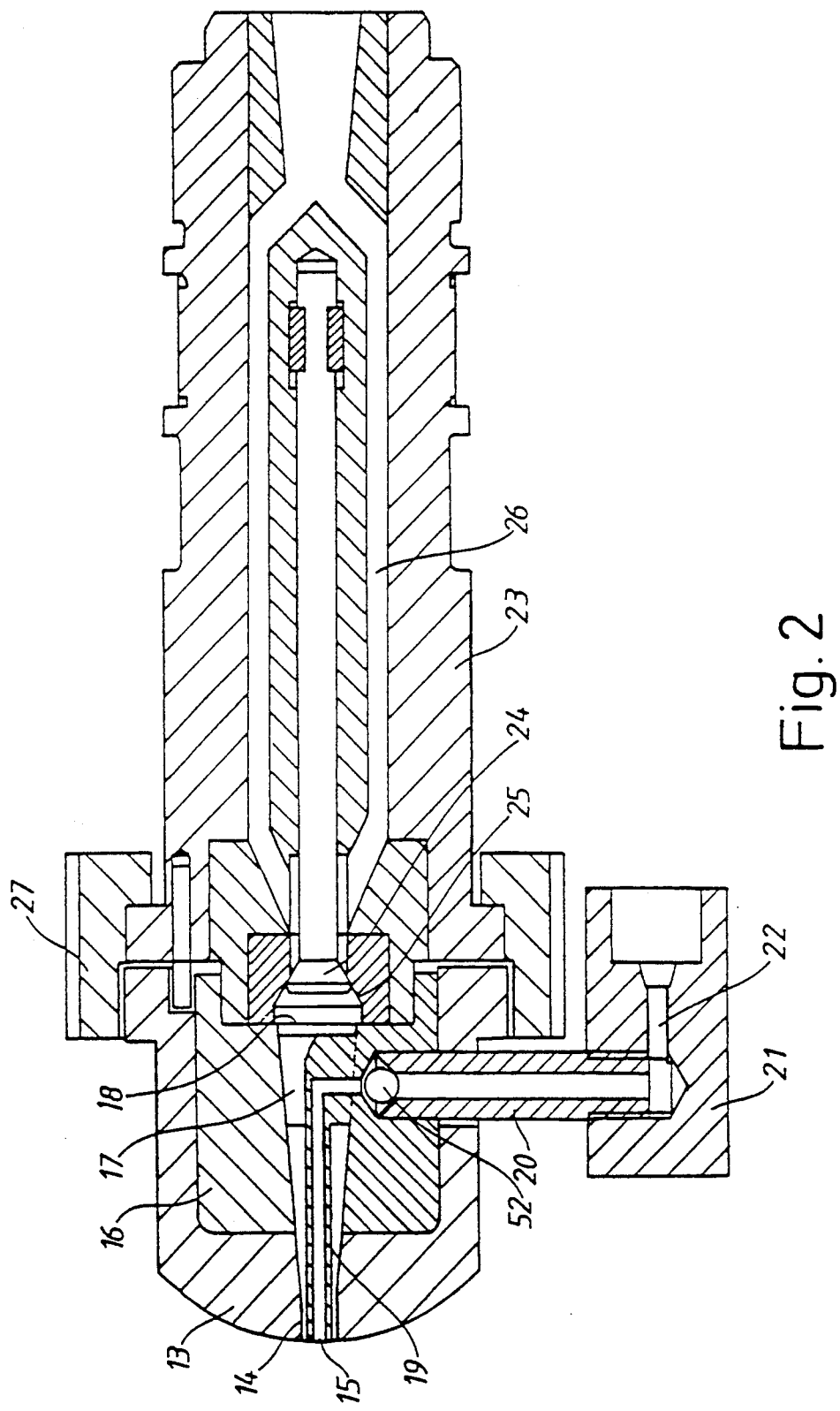
FIG. 2 shows a vertical section through a nozzle portion of FIG. 1 through which the plastic and the gas is delivered to an associated mold.

With specific reference to FIG. 2, the nozzle 10 comprises a front mounted hat-like part 13 in which a central outlet channel 14 with an outlet 15 is arranged. In the part 13 there is an insert 16 with an axial through channel 17 having an inlet opening 18 for plastic, the channel 17 being coaxial with the outlet channel 14, the two channels partly being shaped as truncated cones joining each other. In the middle of the channel 14 and 17 there is a pipe 19 which is a part of the insert 16 and which extends from the insert into the outlet channel 14 and ends at the center of the outlet opening 15. The pipe 19, at its other end, is formed as a radial channel in the insert 16, and continues as a sleeve 20 which is directed radially and on which a nipple 21 is fastened. The channel in the nipple 21 and in the sleeve 20 has an inlet opening 22 for gas which is transferred to the nozzle.

The nozzle also has a rear part 23 with a valve body 24 which normally abuts a seat 25 and which divides and seals a chamber 26, in which the melted plastic is present, from the inlet opening 18 in the nozzle. The valve body 24 can, by means of a conventional drive device (not shown), be moved axially so that the melted plastic flows from the chamber 26 to the inlet opening 18 of the nozzle. The front part 13 and the rear part 23 of the nozzle are connected to each other by means of locking member 27.

The gas inlet opening 22 of the nozzle 10 communicates via a conduit 28 (See FIG. 1) with a gas accumulator 29 having a fixed volume in which a gas is present under a comparatively high pressure. This gas accumulator is connected to a gas booster 30, i.e. a pressure increasing device, which is fed with gas from a gas source 31, i.e. a gas bottle through a continuation of the conduit 28. The gas booster 30 thus creates a mainly constant pressure in the gas accumulator 29. Preferably, nitrogen is used but other gases or gas mixtures can also be used.

The conduit 28 is provided with a variable throttle 32 by means of which the gas flow to the nozzle can be set with great accuracy at certain desired values corresponding to the produced articles. In its most simple version, the throttle 32 comprises a needle valve by means of which the flow-through-area of the conduit 28 can be changed in a simple way by adjusting the position of the needle valve with the aid of a screw having a fine thread. The conduit 28 also comprises a valve 33 which is activated and deactivated between generally fully opened and closed positions by means of pneumatic, hydraulic and/or electric means 34 with the aid of an electric control unit which will be described below.

Between the gas accumulator 29 and the valve 33, a pressure control device 35 is provided by means of which a suitable pressure can be chosen in the part of the conduit 28 which is situated to the left of the pressure control device 35. The conduit also is provided with pressure sensing devices 36 for observing and controlling the pressures in the different parts of the conduit 28. A safety valve 37 and a dehumidifier 38 for the gas are also provided, as illustrated.

In order to make it possible to recover and recycle gas which flows out into the conduit 28 through the throttle 32, there is a branched off conduit 39 which is connected to the conduit 28 to the left of the throttle 32 and between the booster 30 and the gas source 31. This conduit 39 is provided with a valve 40 activated and deactivated between generally fully opened and closed positions by pneumatic, hydraulic and/or electric means 41 with the aid of said control unit. The conduit 39 also is provided with a throttle 42, a check valve 43 and a booster 44 increasing the pressure of the gas in the conduit to the left of the booster 44 to the same pressure as in the conduit portion between the booster 30 and the gas source 31.

The control unit (See FIG. 3) has a main switch 45 connecting the main supply line 46 with the primary winding of a transformer 47, the secondary side of which is connected to a switch on delayed relay 48 which receives an input signal from the injection molding machine when the valve body 24 is moved so that the melted plastic is ejected into the nozzle 10. The delay of relay 48 can be set, for example, between 0.05 and 10 sec. The relay 48 connects the second side of the transformer with a time relay 49, and this relay activates the control means 34 (also See FIG. 1) for opening the valve 33. The time relay 49 can be set to keep the valve open for 1-1000 sec. When the time relay 49, after a predetermined time, switches back to its original position and the valve 33 is closed, another time relay 50 is activated for a predetermined period. This relay activates the means 41 (also See FIG. 1) for opening the valve 40.

Figure 3:
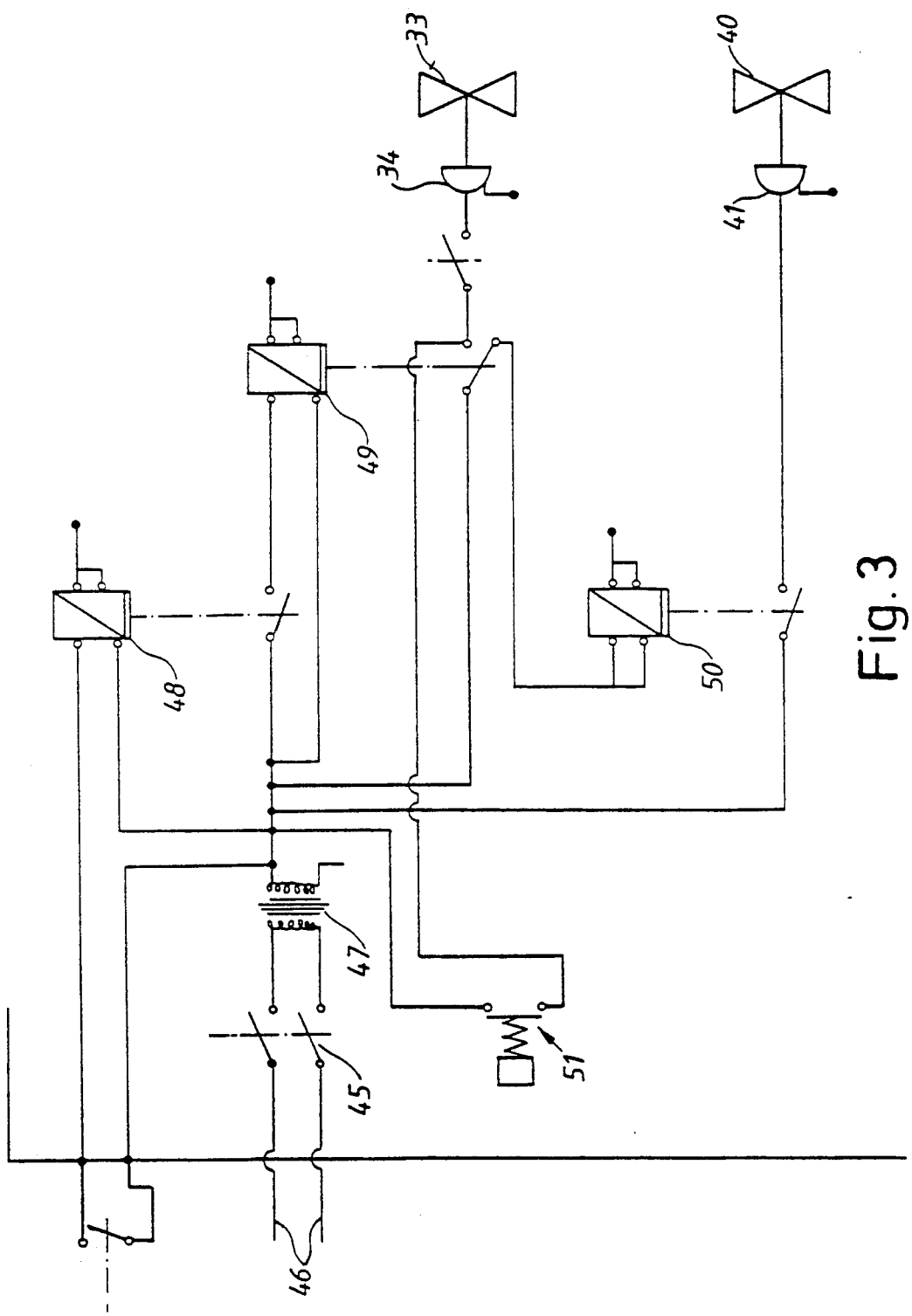
FIG. 3 shows the electric control unit for the device illustrated in FIG. 1.

The control unit of FIG. 3 is also provided with a switch 51, and an associated electric circuit for manually opening the valve 33 in order to empty the conduit and the gas channels by a gas flow through the nozzle if something should clog the channels.

The device operates in the following way. Normally the valve 33 in the conduit 28 is closed, the gas booster 30 keeping a mainly constant pressure in the gas accumulator 29, the pressure being about 100-1000 bar. The valve body 24 abuts the seat 25 in the nozzle which means that the melted plastic is prevented from entering the nozzle. When a plastic article is to be formed, the nozzle 10 is moved to abut the mold 12 and the valve body 24 is moved to the left in the Figure whereby the melted plastic, by means of the pressure in the nozzle which normally is about 500-1000 bar, is pressed into the channel 17 in the nozzle. The switch-on delayed relay 48 will then be drawn after the predetermined time. Thereby the time relay is activated so that current is transferred to the means 34 which activates the valve 33 so that it opens. This means that gas in the gas accumulator 29 flows through the conduit 28 and through the throttle 32. By adjusting the throttle an adaption of the gas flow through the nozzle 10 occurs so that the velocity of the inflowing gas into the nozzle mainly corresponds to the flow-through velocity of the melted plastic. The gas will thus flow through the pipe 19 and flow out at the outlet opening 15 of the nozzle so that a central gas core is formed which is surrounded by the plastic. Because of the switch-on delay of the valve a plastic plug is formed at the front, preventing the gas from breaking through the plastic and causing holes in its surface layer. The gas then presses and expands the plastic towards the walls of the mold. When the valve body 24 then is returned to its original position the, melted plastic will cease flowing through the nozzle. The communication, however, is maintained between the gas accumulator 29 and the mold 12 because the relay 49 remains in its drawing position during the time which has been set. The communication between the accumulator 29 and the mold 12 is preferably maintained during the complete injection molding procedure, with the exception of the introduction phase, as well as it is maintained afterwards during the cooling period. When the relay 49 is deactivated, current flows to the relay 50 thereby establishing an electric connection to the control means 41 for opening the valve 40 so that gas in the conduit 28 to the left of the valve 33 and in the nozzle 10 and mold 12 flows through the conduit 39 and is compressed by the booster 44 to the same pressure as in the gas source 31. After a predetermined time the relay 50 deactivates the means 41 thereby closing the valve 40 again.

It should be mentioned that it is necessary to use a conventional check valve 52 in the gas supply channel of the nozzle 12 preventing gas from flowing back from the mold into conduit 28 since there is a risk that pieces of plastic will follow the back-flowing stream and clog the gas flow channel. This, of course, results in a reduction of the amount of gas which is recollected but usually the amount of gas which is enclosed by the conduit 28 is large compared to the amount of gas which is enclosed in the molded article being produced which means that the ratio of recollection is sufficient.

What is claimed is:

1. In a device for producing hollow plastic articles by an injection molding procedure, the device comprising a nozzle (10) with a first inlet opening (18) for melted plastic from an injection molding apparatus and a second inlet opening (22) for a pressurized gas, the nozzle including means (19) for directing the gas into the melted plastic and an outlet opening (15) for the gas and the melted plastic, the outlet opening via a gate being connectable with a mold space, the improvement wherein the second inlet (22), via a conduit (28), communicates with a gas accumulator (29) having a constant volume and in which the gas has a mainly constant pressure, and that said conduit has a variable throttle (32) by which the flow of gas from said constant volume gas accumulator into the nozzle can be adjusted.

2. A device according to claim 1, wherein the conduit (28) also includes a valve (33) between the gas accumulator (29) and the nozzle (10).

3. A device according to claim 2, including an electric control circuit for the valve (33), the control circuit comprising control means (48, 49) for opening the valve (33) a predetermined time after that the injection of the melted plastic into the nozzle (10) has been initiated.

4. A device according to claim 3, wherein the predetermined time is 0.05-10 sec.

5. A device according to claim 3, wherein the control means includes a time delay relay (49) for maintaining the valve (33) in an open position during a predetermined time which is 1–1000 sec.

6. A device according to any of the preceding claims, including a branched off conduit (39), which extends from the conduit (28) at the outlet side of the throttle (32) to the inlet side of the accumulator (29) for recollecting a part of the gas which flows through the throttle.

7. A device according to claim 6, wherein the branched off conduit (39) is provided with a booster for increasing the pressure of the gas which is recollected.

8. A device according to claim 6, wherein the branched off conduit (39) is provided with a valve (40) which is closed while plastic and gas are ejected into the mold and afterward while the hollow plastic articles are being cooled.

9. A device according to claim 7, wherein the branched off conduit (39) is provided with a valve (40) which is closed while plastic and gas are ejected into the mold and afterward while the hollow plastic articles are being cooled.

10. A device according to claim 9, wherein the valve (40) of the branched off conduit (39) is opened by a time relay (50) when the valve (33) of the conduit is closed.

11. A device according to claim 6, wherein a branched off conduit is provided with a check valve (43).

12. A device according to claim 7, wherein the branched of conduit is provided with a check valve (43).

13. A device according to claim 8, wherein the branched of conduit is provided with a check valve (43).

14. A device according to claim 9, wherein the branched of conduit is provided with a check valve (43).

15. A device according to claim 10, wherein the branched of conduit is provided with a check valve (43).

* * * * *